INVENTOR
JOHN D. WATTS

United States Patent Office 3,141,685
Patented July 21, 1964

3,141,685
COUPLING WITH LEAK DETECTING MEANS AND SEALING RING THEREFOR
John D. Watts, Houston, Tex., assignor to Gray Tool Company, Houston, Tex., a corporation of Texas
Filed Oct. 11, 1960, Ser. No. 61,989
13 Claims. (Cl. 285—93)

This invention relates to couplings and more particularly to couplings of the type adapted to seal against high fluid pressures.

In its broadest aspects, the present invention embodies the sealing principles disclosed and claimed in Watts and Hill Patents 2,766,829; 2,766,998; and 2,766,999, all issued on October 16, 1956. The above patents disclose a coupling including two parts to be connected together in sealed relation, such parts as disclosed, preferably constituting oil well parts which may be subjected to excessively high fluid pressures. The parts may be the casing or tubing sections, the control equipment parts utilized in the drilling procedure or the Christmas tree parts utilized in the well completion procedure, all as referred to in the patents. The above mentioned parts of the coupling have end surfaces adapted to be presented towards one another and a sealing ring of hard metal or the like is interposed between the end surfaces of the parts to effect a fluid-tight seal. Each part is provided with an outwardly tapering annular seating surface adjacent the end surface and the sealing ring comprises a flange portion having oppositely disposed flexible lips and a centrally disposed rib portion. The lips are provided with annular seating surfaces which taper outwardly toward the rib portion at an acute angle with respect to the longitudinal axis of the sealing ring. The coupling is completed by the provision of suitable means for drawing the two parts toward one another into sealing engagement with the ring therebetween.

During the movement of the parts toward one another, the rib portion serves to engage the end surfaces of the parts to limit the amount of movement of the parts together. The sealing surfaces on the lips of the sealing ring are arranged to engage and to be deflected by and sealed with the sealing surfaces of the parts. The deflection of the lip surfaces is within the elastic limit of the metal or other material utilized to form the sealing ring and the deflection serves to provide a stored energy which acts to increase the effectiveness of the seal.

As referred to in the above-mentioned patents, the sealing ring as applied to well parts achieves the following advantages:

(a) A minimum pressure area seal is effected.

(b) A full bore through the well head parts is provided, without sacrificing the minimum pressure area seal.

(c) The rib on the sealing ring affords rigidity, which is necessary both in handling the sealing ring and in preventing excessive crushing during its use, and without sacrificing the full bore or minimum pressure area, as referred to.

(d) The metal of the well head parts being connected, serves to back up the sealing ring outwardly of its lips, and the rib of the sealing ring provides added strength to resist any bursting tendency which would be caused by the high fluid pressures being controlled.

(e) Because the inner surfaces of the well head parts contact the outer surfaces of the rib of the sealing ring, a very rigid union results, and a constant spacing of the inner surfaces of the flanges of the well head part is assured.

(f) The design of the lips of the sealing ring makes it possible for the pressure within the union to aid in the sealing action, while the rib gives the sealing ring the necessary body to maintain rigidity.

(g) The sealing ring is self-aligning, both angularly and concentrically, when positioned between the well head parts and clamped thereby.

An object of the present invention is the provision of a coupling of the type described which obtains all the advantages thereof as referred to above, which coupling provides an annular fluid pressure seal at two spaced positions adjacent the end surface of each coupling part, the two spaced sealing positions defining therebetween an annular pressure chamber exteriorly of the main fluid pressure being sealed by the coupling whereby the effectiveness of the seal can be continually monitored by the pressure in the annular pressure chamber.

The present invention has particular applicability in sealing parts which carry or contain high pressure fluids which would present danger if allowed to escape to the atmosphere. For example, highly poisonous gases, highly inflammable gases or the like, can be effectively retained in a safe manner with the use of the seal of the present invention. Where such conditions prevail it is preferable to apply a slightly higher pressure to the annular pressure chamber of the seal through suitable exterior means, so that if leakage should occur past the seal provided by the present coupling, such leakage will be in a direction from the annular pressure chamber into the main fluid pressure, thereby positively preventing leakage of the main fluid pressure to the exterior of the parts prior to the discovery of the leak.

Accordingly it is a further object of the present invention to provide a sealing coupling of the type described having improved means for positively preventing exterior leakage of a high pressure fluid contained within the parts.

Still another object of the present invention is the provision of a sealing coupling of the type described having a sealing ring provided with a pair of oppositely disposed flexible lips, the sealing ring being related to the end surfaces of the parts being connected so as to provide a pair of annular seals spaced apart and defining a pair of intercommunicating pressure chambers therebetween associated with each part.

Still another object of the present invention is the provision of a sealing coupling of the type described wherein the parts to be connected are provided with integral or rigid sealing elements which provide for spaced annular sealing positions defining a pressure chamber therebetween for the purposes specified.

Still another object of the present invention is the provision of a sealing coupling of the type described wherein the spaced annular sealing positions and pressure chamber therebetween are defined by spaced pairs of oppositely disposed flexible lips formed on a sealing ring.

Still another object of the present invention is the provision of a sealing coupling of the type described wherein the spaced sealing positions and pressure chamber therebetween are defined by a single pair of oppositely disposed flexible lips.

A still further object of the present invention is the provision of a sealing ring construction for providing spaced sealing positions and a pressure chamber therebetween.

These and other objects of the present invention will become more apparent during the course of the following detailed description and appended claims.

The invention may best be understood with reference to the accompanying drawings wherein an illustrative embodiment is shown.

Figure 1:
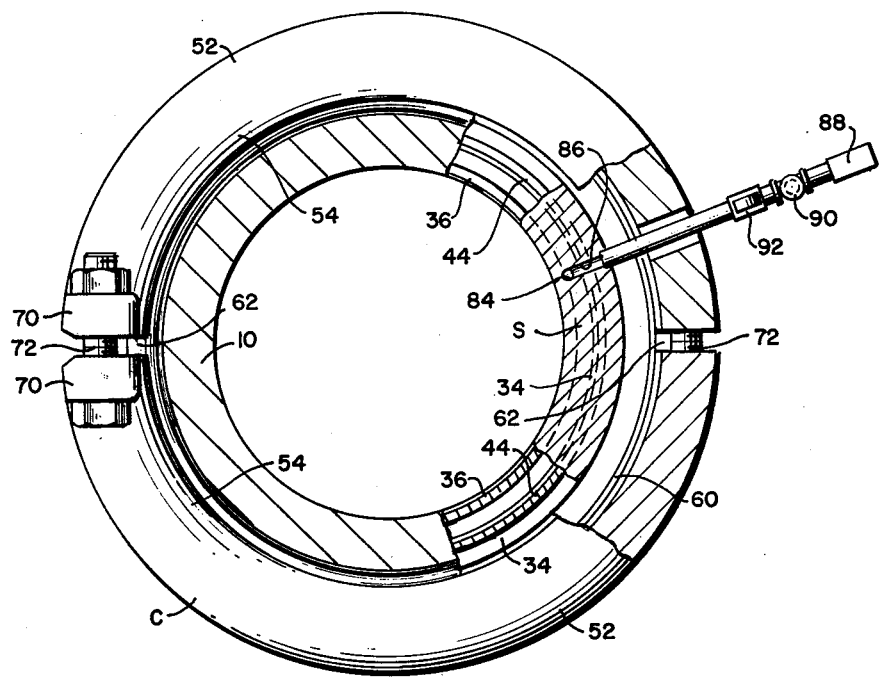
FIGURE 1 is a horizontal sectional view with certain parts broken away of a coupling embodying the principles of the present invention.
Figure 2:
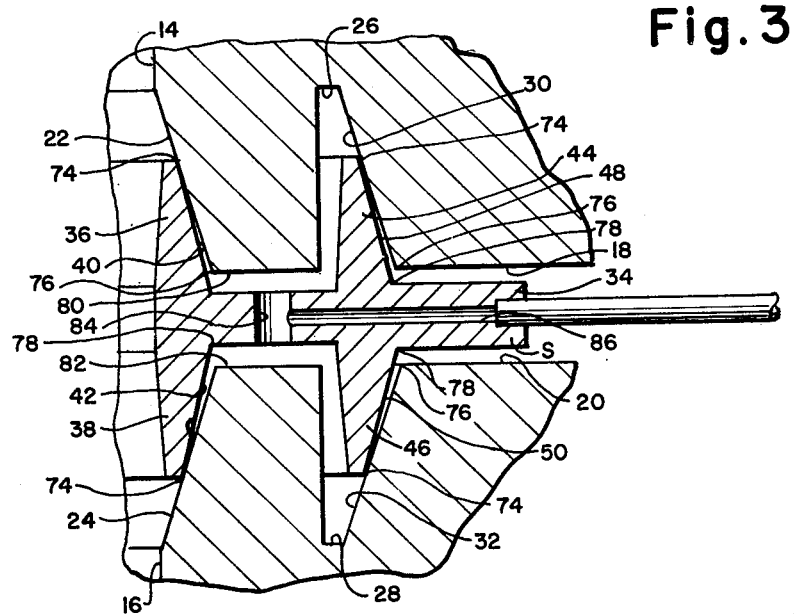
FIGURE 2 is an enlarged fragmentary vertical sectional view of the coupling shown in FIGURE 1 illustrating the parts in their initial position of engagement.

Referring now more particularly to FIGURES 1 and 2, there is shown therein one embodiment of a coupling embodying the principles of the present invention. As shown, the coupling includes two conduit parts 10 and 12, each having aligned inside bores 14 and 16 respectively. It will be understood that while the parts 10 and 12 are shown as being of the type adapted to convey fluid under pressure, such parts may be of the type which serve to merely hold fluid under pressure, such as container parts or receptacle parts. Specifically, the present invention has particular applicability to high pressure autoclaves and the like. In such instances one of the parts may simply be a closure member while the other part has a fluid pressure opening therein which is closed at the end opposite from the closure end.

In the embodiment shown, the parts are provided with annular end surfaces 18 and 20 respectively and have inner outwardly tapering annular sealing surfaces 22 and 24 respectively adjacent the end surfaces 18 and 20. As shown, the sealing surfaces are provided in the terminal portion of the walls defining the bores 14 and 16. The end surfaces 18 and 20 have annular grooves 26 and 28 formed therein at a position spaced outwardly of the associated sealing surface, such grooves defining outer outwardly tapering annular sealing surfaces 30 and 32 respectively.

The coupling of the present invention as shown in FIGURES 1 and 2 also embodies a sealing ring S, arranged to be interposed between the parts 10 and 12 to provide a sealing engagement therebetween when the end surfaces 18 and 20 of the parts presented toward each other and drawn toward one another by any suitable means such as clamps, generally indicated at C in FIGURE 1.

The sealing ring S is preferably made of a suitable metal and has an exterior rib or rib portion 34 which is positioned between the end surfaces 18 and 20 of the parts. Formed integrally with the interior of the rib 34 is a flange portion of the ring defining a pair of inner oppositely disposed flexible annular lips 36 and 38. The lips provide exterior sealing surfaces 40 and 42 respectively which taper outwardly toward the rib 34. Formed integrally with the rib 34 at a position spaced outwardly from the inner lips 36 and 38 is a pair of oppositely disposed outer flexible annular lips 44 and 46 respectively. These lips in turn are provided with annular sealing surfaces 48 and 50 respectively which taper outwardly toward the rib 34.

The manner in which each pair of lips seals with the associated pair of sealing surfaces of the parts 10 and 12 is in accordance with the sealing principle disclosed in the above-mentioned patents. Briefly, the sealing ring S is preferably made of elastic steel, at least the lip portions are sufficiently elastic so that they may be bent inwardly within the elastic limit of the metal from the position illustrated in FIGURE 2 to that of FIGURE 3, when the exterior clamps C draw the parts being joined toward one another.

As shown, the clamps C comprise two or more segmental clamp members 52 each having a pair of segmental annular flanges 54 and 56 extending inwardly from the sides thereof. The annular flanges are provided with wedging surfaces 58 and 60 which converge inwardly with respect to each other. The wedging surfaces are arranged to engage cooperating wedging surfaces 62 and 64 formed on outwardly extending annular flanges 66 and 68 provided on the parts 10 and 12 respectively adjacent their end surfaces 18 and 20. Extending longitudinally outwardly from each end of each segmental clamp member is a pair of oppositely disposed apertured lugs 70 arranged to receive tightening bolt assemblies 72. The lugs 70 are disposed within the plane of the outer periphery of the segmental clamping members. It will be seen that when the bolt assemblies 72 are tightened the segmental clamp members will be moved radially inwardly with respect to each other and due to the engagement of the wedging surfaces, the parts 10 and 12 will be drawn toward one another.

While it is preferred that the sealing ring S be made of an elastic hard metal such as steel, it can be made of softer metals such as brass or even of suitable plastics such as Bakelite. However, the elastic steel is preferred, so that when the lips of the ring are bent inwardly within the elastic limit of the metal, they will return to the normal position of FIGURE 2 when the force is removed so that a particular sealing ring may be re-used.

Figure 3:
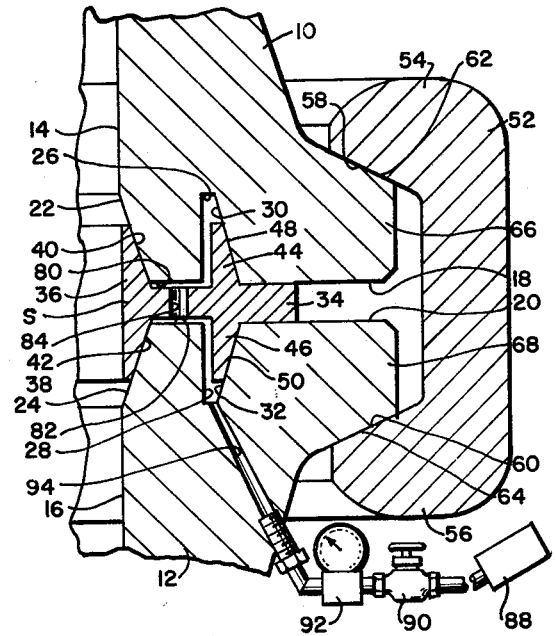
FIGURE 3 is a fragmentary enlarged vertical sectional view of a modified form of the coupling, the parts being shown in their operative position.

When the bolt assemblies 72 of the clamps are hand-tightened, initial contact is made at points 74, as shown in FIGURE 2, on the outer ends of the lips of the sealing ring, against the sealing surfaces of the two parts being connected. The acute angle between the horizontal center line of the rib 34 and the sealing surfaces of each of the lips, is somewhat greater than the acute angle between this center line and the sealing surfaces on the parts. The angular difference is greatly exaggerated in FIGURE 2, a preferred angular relation being of the order of 1°. On the other hand, the corner points 76 on the parts, at the outer ends of their sealing surfaces, are in longitudinal alignment with the corner points 78 on the sealing ring where the sealing surfaces 40, 42, 48 and 50 of the sealing ring join with the flat surfaces of its rib 34. Accordingly, when the two parts are drawn toward one another by the clamps, the angle formed at the points 74 between the sealing surfaces becomes progressively more acute up to the point where the end surfaces 18 and 20 are brought to a stop when they engage the flat surfaces of the rib 34, at which time the pairs of engaging sealing surfaces on the lips of the sealing ring and on the ends of the conduit parts, are parallel with and flush against one another, as shown in FIGURE 3. As the seal is completed, the lips of the sealing ring are flexed inwardly around the pivot points 78 of the sealing ring, which pivot points are somewhere in the neighborhood of the base ends of the sealing lips, adjacent to the corner points 76.

Thus, when the exterior clamp is tightened from its hand-tight position to the position of FIGURE 3, the sealing lips of the sealing ring are deflected inwardly. Because this deflection is within the elastic limit of the material from which the lips are made, energy is stored in the lips and they place themselves tightly against the sealing surfaces of the conduit parts. When the clamp is fully set up, as illustrated in FIGURE 3, the sealing surfaces of the lips are tight and sealingly engage with the corresponding sealing surfaces on the conduit parts, and thereafter, when the union is subjected to pressure, this pressure is exerted outwardly against the inner face of the sealing ring, to make the sealing action more effective. It will be understood that only a moderate force will be required to be exerted on the bolt assemblies of the clamps, in order to deflect the sealing lips inwardly to the position illustrated in FIGURE 3; yet, the union is a completely effective one because the pressure subject area is substantially reduced, and the pressure acts against the lips of the sealing ring, to increase effectiveness of the seal thus formed. With the construction as illustrated, the attendant will always know when he has properly tightened the nuts of the clamping assembly, for it is only necessary that he tighten them until the tightening action is stopped, by the contact of the end surfaces 18 and 20 of the parts and against the exterior flat faces of the rib 34 of the sealing ring, as shown in FIGURE 3. Furthermore, it is not possible for the attendant to set up on the bolt assemblies of the clamps to a point where the sealing ring would be crushed, for the rib 34 provides a definite stop against excessive make up and subsequent operating loads. The rib 34 of the sealing ring is of such design that it maintains a constant diameter, and is not drawn inwardly during the clamping action, the only movement of the sealing ring being the inward bending of the lips thereof, as described.

When the union is tightened, a substantially unitary structure results, the strength of the metal of the ends of the parts serving to back up the sealing ring whereby extremely high pressures may be withstood. The rib 34 of the sealing ring provides increased strength, in order to resist any bursting tendency at the union caused by high fluid pressure which is being handled. The sealing ring is of symmetrical design, so that it is self aligned when placed in position between the ends of the parts.

It will be noted that the extent of the rib portion 34 of the sealing ring S between the inner pair of lips and the outer pair of lips has a thickness less than the thickness of the rib portion exterior of the outer pair of lips. The exterior extent of the rib portion provides a limiting abutment between the end surface of the parts which cooperates as referred to above to limit the amount of movement of the parts toward one another and hence the deflection of the lips. By relieving the rib portion extending between the pairs of lips, pressure chambers 80 and 82 are formed between the spaced annular sealing surfaces associated with each part. It will be noted that the annular grooves 26 and 28 are of a size greater than the associated lips 44 and 46 so as to provide an extension of the pressure chambers which communicate the latter with the outer sealing surfaces.

The chambers 80 and 82 are suitably interconnected as by a longitudinally extending opening 84 formed in the rib portion 34 of the sealing ring in the extent thereof between the pairs of lips. It will be understood that one or more of such openings may be provided. In the embodiment shown in FIGURES 1 and 2 the intercommunicating chambers 80 and 82 are communicated exteriorly of the coupling by a radially extending passage 86 formed in the sealing ring S in communication with the opening 84.

From the above it can be seen that in operation, an annular fluid tight chamber is provided by the coupling in surrounding relation to the seal retaining the interior fluid pressure of the parts. This annular fluid tight chamber provides a means which can be readily monitored to determine the effectiveness of the seal of the interior fluid pressure. For example, as shown in FIGURES 1 and 2, where it is desired to positively prevent exterior leakage of the interior fluid as when such interior fluid would present a dangerous situation if allowed to leak to the atmosphere, a fluid pressure can be applied to the annular chamber which is in excess of the interior fluid pressure. In FIGURES 1, 2 and 3 there is illustrated a schematic arrangement for applying such fluid pressure which includes a source of fluid pressure 88 communicating in series with a control valve 90 and pressure gage 92 with the passage 86 by suitable conduit. The pressure applied to the intercommunicating chambers 80 and 82 is in excess of the interior pressure an amount less than that which would cause an inward deflection of the inner lips and thus cause flow from the chambers 80 and 82 into the interior. However, in the event that the sealing connections between the surfaces 22 and 40 and 24 and 42 are not completely effective, there will be a loss of pressure in the intercommunicating chambers 80 and 82 which is readily discernible on the pressure gage 92. In this regard, it will be noted that the outer sealing lips 44 and 46 will be urged into tighter sealing engagement with their respective cooperating sealing surfaces 30 and 32 by the pressure within the intercommunicating chambers 80 and 82 so that if leakage does occur it will be along the interior sealing surface. In some instances it may be desirable to apply a negative pressure to the intercommunicating chambers 80 and 82 rather than a pressure in excess of the interior pressure. A negative pressure in the intercommunicating chambers 80 and 82 would serve to increase the effectiveness of the seal provided by the inner lips. It will also be understood that atmospheric pressure could normally be maintained in the intercommunicating chambers 80 and 82 in which event it would be necessary only to utilize a pressure gage to sense any rise in the pressure within the chambers.

In FIGURE 3 there is shown a modified form of the coupling wherein the intercommunicating chambers 80 and 82 are communicated exteriorly with the pressure gage 92, valve 90 and pressure source 88 through a passage 94 formed in one of the coupling parts such as the part 12. It will be noted that the passage 94 communicates at one end with the annular groove 28 and at its opposite end with the conduit of the fluid pressure system.

Figure 4:
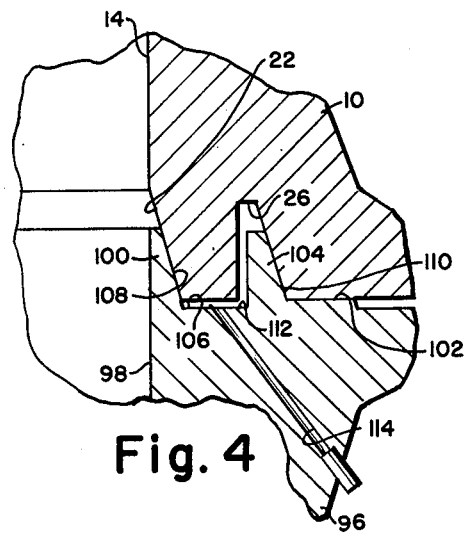
FIGURE 4 is a view similar to FIGURE 3 showing a further modification of the coupling.

In FIGURE 4 there is shown a coupling in which the sealing ring S is eliminated and the spaced annular sealing surfaces defining a fluid tight chamber therebetween are provided by a lip construction integral with the parts to be sealingly connected. As shown, the coupling includes a part 10 which may be identical with the part 10 previously described. The other part, designated by the numeral 96, has an opening 98 therein, the wall of which terminates in a flexible lip 100. The part 96 also includes an end surface 102 which has an outer flexible lip 104 formed integrally thereon in spaced relation to the inner lip 100. It will be noted that the end surface between the inner and outer lips is undercut, as indicated at 106. The lips 100 and 104 provide tapering sealing surfaces 108 and 110 respectively which are arranged to engage and be deflected by and sealed with the surfaces 22 and 30 of the part 10, all as previously described. The undercut portion 106 of the end surface 102 defines with the enlarged annular groove 26 of the part 10 a single annular fluid chamber 112 which extends between the lips 100 and 104. This chamber is communicated to the exterior of the parts by passage means in one of the parts such as passage 114 in the part 96. As before, a suitable fluid system may be connected with the passage to apply and sense the fluid pressure within the chamber.

Figure 5:
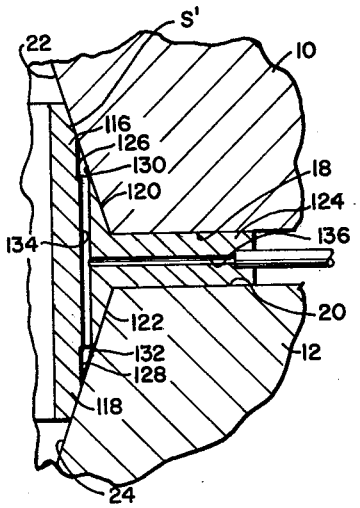
FIGURE 5 is a view similar to FIGURE 3 showing another modification of the coupling.

In FIGURE 5 there is shown still another modified form of a coupling embodying the principles of the present invention. In this embodiment, the spaced annular seals defining intercommunicating annular fluid chambers therebetween are provided by a sealing ring S' having a single pair of lips indicated at 116 and 118. As shown, the lips are provided with sealing surfaces 120 and 122 which taper outwardly toward a central rib portion 124 of the sealing ring, all in the manner previously described. However, the sealing surfaces 120 and 122 have formed therein annular grooves 126 and 128 which separate the sealing surfaces into two spaced generally aligned sealing portions so that they will form with the sealing surfaces 22 and 24 of the coupling parts 10 and 12 spaced annular seals. The grooves 126 and 128 form pressure chambers 130 and 132 between these annular seals and the chambers are intercommunicated by one or more longitudinally extending passages 134 formed in the ring S'. As before, the intercommunicating chambers are communicated exteriorly of the coupling by a radially extending passage 136 in the sealing ring which may be suitably connected with the fluid system.

In this embodiment it will be noted that the area of the chambers 130 and 132 is relatively small with respect to the area of the sealing interengaged surfaces on opposite sides thereof. Because of this difference in area a high fluid pressure can be applied to the chamber slightly in excess of the interior fluid pressure of the parts without overcoming the mechanical energy stored in the lips and thus cause the latter to deflect away from the sealing surfaces of the parts to provide leakage. The arrangement as shown in FIGURE 5 is preferred because of its simplicity in construction and the fact that it can be more economically produced. The arrangement is effective, in the manner indicated above, to monitor the pressure within the intercommunicating chambers 130 and 132 through observation of the pressure dial of the exterior fluid system.

It will be understood that while the construction as shown in FIGURE 5 is preferred, the sealing surfaces 22 and 24 of the coupling parts could be grooved in lieu of the sealing surfaces of the lips or in addition thereto. Moreover, the chambers could be intercommunicated by passages formed in the parts communicating with such chambers and connected together by suitable conduit exterior of the coupling. It will also be understood that the form of the invention shown in FIGURE 5 may be readily embodied in an integral construction similar to that shown in FIGURE 4.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A sealing coupling comprising first and second annular parts of hard metal or the like having annular end surfaces presented toward one another to be connected together and sealed against a fluid under pressure within said parts, one of said parts having outwardly tapering annular sealing surface means adjacent the end surface of the part extending at an acute angle with respect to the longitudinal axis of the part, the other of said parts having flexible lip means adjacent the end surface thereof, said flexible lip means having sealing surface means arranged to engage and be deflected by and to seal with the sealing surface means of said one part when the end surfaces of said parts are drawn toward one another, said sealing surface means interengaging each other at spaced annular positions when the end surfaces of said parts are drawn toward one another, said parts between said positions defining an annular fluid tight chamber, means for communicating said chamber exteriorly of said parts, the end surfaces of said parts having abutting portions engageable with each other in response to the movement of the end surfaces of said parts toward one another to limit the degree of such movement, and means for drawing the end surfaces of said parts toward one another to such limit to effect the seal; a pressure gauge, means communicating said gauge with said chamber through said exterior communicating means and means for communicating a fluid pressure to said chamber through said exterior communicating means.

2. A coupling as defined in claim 1 wherein said other of said parts comprises an annular sealing ring of hard metal or the like.

3. A coupling as defined in claim 1 wherein said one of said parts comprises a conduit part having a fluid passage therein, the wall of which terminates in an outwardly tapering annular sealing surface forming at least a portion of annular sealing surface means of said one part.

4. A coupling as defined in claim 3 wherein said other of said parts comprises a conduit part having an aligned fluid passage formed therein, the wall of which terminates in an inner lip forming at least a portion of said lip means.

5. A coupling as defined in claim 3 wherein said other of said parts comprises a sealing ring of hard metal or the like having an aligned fluid passage therein of a size substantially equal to the size of the fluid passage of said other part.

6. A sealing coupling comprising first and second annular parts having annular end surfaces presented toward one another to be connected together and sealed against a fluid under pressure within said parts, each of said parts having outwardly tapering sealing surface means adjacent the end surface thereof, an annular sealing ring of hard metal or the like for providing a seal between the end surfaces of said parts when they are drawn toward one another, said sealing ring comprising a centrally disposed annular rib portion having oppositely disposed flexible lip means integral therewith, said lip means having exterior sealing surface means tapering outwardly toward said rib portion at an acute angle with respect to the longitudinal axis of said ring and which are arranged to engage and be deflected by and sealed with said part sealing surface means when the end surfaces of said parts are drawn toward one another, said ring sealing surface means engaging said part sealing surface means when the end surfaces of said parts are drawn toward one another at spaced annular positions, each part and the side of said ring defining most closely adjacent the part defining an annular fluid tight chamber between said spaced annular positions of engagement, passage means communicating the chambers associated with each part exteriorly of said parts and ring, a pressure gauge, means communicating said pressure gauge with said chambers through said passage means, means for communicating a fluid pressure to said chambers through said passage means, said rib portion having surfaces engageable between the end surfaces of said parts in response to the movement of the end surfaces of said parts toward one another to limit the degree of such movement, and means for drawing the end surfaces of said parts toward one another to such limit to effect the seal.

7. A coupling as defined in claim 6 wherein said lip means comprises oppositely disposed lips integral with the interior periphery of said rib portion, each of said lips having an exterior sealing surface tapering outwardly toward said rib portion interrupted intermediate its ends by an annular groove so as to form spaced generally aligned sealing surface portions defining said ring sealing surface means, said annular air tight chambers being defined by said annular grooves and the adjacent surfaces of said parts.

8. A sealing coupling comprising first and second annular parts having annular end surfaces presented toward one another to be connected and sealed against a fluid under pressure within said parts, said parts having inner outwardly tapering sealing surfaces adjacent the end surfaces thereof, an annular sealing ring of hard metal or the like for providing a seal between the end surfaces of said parts when they are drawn toward one another, said sealing ring comprising an inner annular flange portion with oppositely disposed flexible lips and an integral substantially centrally disposed exterior rib portion, said lips having exterior sealing surfaces which taper outwardly toward said rib portion in an acute angle with respect to the longitudinal axis of said ring and which are arranged to engage and be deflected by and sealed with said part sealing surfaces when the end surfaces of said parts are drawn toward one another, annular sealing means between each of said part end surfaces and said rib portion disposed in outwardly spaced relation with respect to said sealing surfaces, said rib portion being disposed between the part end surfaces when said sealing surfaces are disposed in sealing engagement, each part end surface and the side of said rib portion most closely adjacent the end part defining an annular fluid tight chamber communicating between the associated interengaged sealing surfaces and annular sealing means, passage means communicating the chambers associated with each part exteriorly of said parts and ring, a fluid pressure gauge, means for communicating said pressure gauge with said chambers through said passage means, means for communicating a fluid pressure to said chambers through said passage means, said rib portion having surfaces engageable between the end surfaces of said parts in response to the movement of the end surfaces of said parts toward one another to limit the degree of such movement, and means for drawing the end surfaces of said parts toward one another to such limit to effect the seal.

9. A coupling as defined in claim 8 wherein each of said annular sealing means comprises an outer flexible lip integral with said sealing ring defining a tapering annular sealing surface and an outer annular sealing surface on the associated part for deflectingly engaging and sealing with the sealing surface of the associated lip.

10. A coupling as defined in claim 8 wherein said parts and said sealing ring includes aligned fluid passages therein, the passage of said sealing ring being at least as large as the smallest adjacent passage of said parts.

11. A unitary continuous closed sealing ring of hard metal or the like for the purpose described, comprising an inner annular flange portion with oppositely disposed flexible lips and an integral substantially centrally disposed external rib portion, said lips having exterior sealing surfaces which taper outwardly toward said rib portion at an acute angle with respect to the longitudinal axis of said sealing ring, each of said sealing surfaces being interrupted between the ends thereof by an annular groove, said ring having passage means formed therein communicating between said annular grooves.

12. A sealing ring as defined in claim 11 wherein said passage means also communicates with the exterior periphery of said ring.

13. In a coupling, an annular part of hard metal or the like having an end surface adapted to be presented toward an end surface of another part to be sealed therewith, said annular part having a fluid opening therein, the wall of which terminates in a flexible annular lip adjacent said end surface, said annular lip having an exterior sealing surface flaring outwardly toward said end surface, and extending at an acute angle with respect to the longtiudinal axis of said opening, said sealing surface being interrupted between the ends thereof by an annular groove, said annular part having passage means formed therein communicating said annular groove with the exterior of said annular part, said other part arranged to define an annular chamber with said annular groove when said other part and said annular part are in sealing engagement whereby said annular chamber is adapted to receive pressurization through said passage means.

References Cited in the file of this patent

UNITED STATES PATENTS

| | | |
|---|---|---|
| 849,115 | France | Apr. 2, 1907 |
| 1,567,813 | Oleson | Dec. 29, 1925 |
| 2,313,169 | Penick | Mar. 9, 1943 |
| 2,384,672 | Gleeson | Sept. 11, 1945 |
| 2,443,944 | Bean | June 22, 1948 |
| 2,760,673 | Laurent | Aug. 28, 1956 |
| 2,766,998 | Watts et al. | Oct. 16, 1956 |

FOREIGN PATENTS

| | | |
|---|---|---|
| 752,354 | France | July 17, 1933 |
| 1,240,842 | France | Aug. 1, 1960 |